United States Patent
Tomono et al.

(10) Patent No.: US 10,437,434 B2
(45) Date of Patent: Oct. 8, 2019

(54) LAYOUT CREATION SYSTEM, SERVER, CLIENT, LAYOUT CREATION METHOD, AND RECORDING MEDIUM

(71) Applicant: FUJIFILM Corporation, Tokyo (JP)

(72) Inventors: Masafumi Tomono, Tokyo (JP); Kei Yamaji, Tokyo (JP); Kazuhiro Mino, Tokyo (JP); Masaki Saito, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 736 days.

(21) Appl. No.: 14/861,453

(22) Filed: Sep. 22, 2015

(65) Prior Publication Data

US 2016/0092054 A1    Mar. 31, 2016

(30) Foreign Application Priority Data

Sep. 26, 2014    (JP) .................................. 2014-196137

(51) Int. Cl.
*G06F 3/0484*    (2013.01)
*G06Q 10/10*    (2012.01)

(52) U.S. Cl.
CPC ......... *G06F 3/0484* (2013.01); *G06Q 10/101* (2013.01)

(58) Field of Classification Search
None
See application file for complete search history.

(56) References Cited

U.S. PATENT DOCUMENTS

| 7,146,398 B2 | 12/2006 | Kuroiwa et al. |
| 2002/0044159 A1 | 4/2002 | Kuroiwa et al. |
| 2007/0043830 A1 * | 2/2007 | Housenbold ........... G06Q 10/10 709/219 |
| 2014/0173393 A1 * | 6/2014 | Roy ....................... G06F 17/218 715/201 |
| 2015/0052452 A1 * | 2/2015 | Alekhin, IV .......... H04L 65/403 715/753 |
| 2015/0341400 A1 * | 11/2015 | Vong ..................... H04L 65/403 715/753 |
| 2016/0048274 A1 * | 2/2016 | Rosenberg ............ G06F 3/0482 715/753 |
| 2016/0048486 A1 * | 2/2016 | Lopategui ........... G06F 17/2288 715/229 |

FOREIGN PATENT DOCUMENTS

| JP | 2002-189691 | 7/2002 |
| JP | 2003-308284 A | 10/2003 |

OTHER PUBLICATIONS

Japan Office Action for Application No. 2014-196137 dated Sep. 12, 2016.

* cited by examiner

*Primary Examiner* — Toan H Vu
(74) *Attorney, Agent, or Firm* — Young & Thompson (57) ABSTRACT

A layout creation system is for jointly creating order data that determines a layout of a photo book by two or more users of two or more clients connected to a server via a network, and the system retains one piece of joint order data jointly created by the two or more users; receives an instruction to divide the joint order data as input by a relevant user; creates divided order data having the same layout as the joint order data in accordance with the instruction to divide the joint order data; and associates the divided order data with sharing users sharing the divided order data.

6 Claims, 9 Drawing Sheets

LAYOUT CREATION SYSTEM, SERVER, CLIENT, LAYOUT CREATION METHOD, AND RECORDING MEDIUM

CROSS-REFERENCE TO RELATED APPLICATIONS

The present application claims priority under 35 U.S.C. § 119 to Japanese Patent Application No. 2014-196137, filed on Sep. 26, 2014. The above application is hereby expressly incorporated by reference, in its entirety, into the present application.

BACKGROUND OF THE INVENTION

The invention relates to a layout creation system, a server, a client, a layout creation method, and a recording medium, with which a plurality of users jointly create order data that determines the layout of a photo book.

It has become possible to easily order a photo book from one's home or at a store. Furthermore, when considering the themes (wedding ceremony, travel and the like) that are often used in photo books, there are now also cases where a plurality of people jointly create a single photo book.

For example, JP 2003-308284 A relates to a device with which a plurality of users who constitute a group jointly create one shared document at the same time without gathering in one place. JP 2003-308284 A discloses that information for creating a shared document such as an electronic album is transmitted from a server to a user terminal, information on editing of the shared document performed at the user terminal on the basis of the provided information for creating the shared document is transmitted to the server, and the shared document is edited at a shared document server in accordance with the information on the editing of the shared document performed at the user terminal.

SUMMARY OF THE INVENTION

In JP 2003-308284 A, a plurality of users can jointly create one shared document at the same time; however, there are the three problems of (1) to (3) given below.

(1) For example, when a plurality of users jointly create a photo book, images (including both still images and moving images) to be used in the photo book are provided by the plurality of users. In this case, when images are automatically selected, a problem may occur since images that a user does not wish to disclose to other users may be shared. It is therefore necessary to make the user select images that the user wishes to share; however, at that time, there is a problem in that the selection operation is troublesome when the user selects one from among a list of a large number of retained images owned by the user.

(2) When a plurality of users jointly create a photo book and the creation of order data that determines the layout of the photo book has not been finished due to the circumstances related to time or the like, there may be the case where it is desirable for the order data that is still in the process of being created to be (divided and) turned over to individual users or a specific user group for subsequent creation processing to be performed. However, in JP 2003-308284 A, since the object is to create one photo book, the order data cannot be divided for individual users or a specific user group.

(3) In JP 2003-308284 A, when individual users separately create order data, it is not possible to combine a plurality of pieces of order data created separately by the individual users of a specific user group, to create one piece of order data.

A first object of the invention is to solve the aforementioned problems of the conventional art and provide a layout creation system, a server, a client, a layout creation method, a program, and a recording medium with which order data jointly created by a plurality of users can be divided for each user or a specific user group, and a plurality of pieces of order data separately created by respective users of a specific user group can be combined.

In addition to the first object, a second object of the invention is to provide a layout creation system, a server, a client, a layout creation method, a program, and a recording medium with which the troublesomeness can be eliminated when a user designates a user image to be transmitted to a server as a shared image from among user images.

In order to attain the object described above, the present invention provides a layout creation system for jointly creating order data that determines a layout of a photo book by two or more users of two or more clients connected to a server via a network, the server comprising:
an order data retainer configured to retain one piece of joint order data jointly created by the two or more users,
each of the two or more clients comprising:
an instruction input unit configured to receive an instruction to divide the joint order data as input by a relevant one of the two or more users, and
the server further comprising:
an order data divider configured to create divided order data having a same layout as the joint order data in accordance with the instruction to divide the joint order data; and
a user associating unit configured to associate the divided order data with sharing users sharing the divided order data.

Also, the present invention provides a layout creation system for jointly creating order data that determines a layout of a photo book by two or more users of two or more clients connected to a server via a network, the server comprising:
an order data retainer configured to retain two or more pieces of separate order data separately created by the two or more users,
each of the two or more clients comprising:
an instruction input unit configured to receive an instruction to combine the two or more pieces of separate order data as input by a relevant one of the two or more users, and
the server further comprising:
an order data combiner configured to combine the two or more pieces of separate order data to create combined order data in accordance with the instruction to combine the two or more pieces of separate order data; and
a user associating unit configured to associate the combined order data with two or more sharing users being users who share the combined order data and each have created each of the two or more pieces of separate order data.

Also, the present invention provides a server that is used in a layout creation system for jointly creating order data that determines a layout of a photo book by two or more users of two or more clients connected to the server via a network,
the server comprising:

an order data retainer configured to retain one piece of joint order data jointly created by the two or more users;

an order data divider configured to create divided order data having a same layout as the joint order data in accordance with an instruction to divide the joint order data as input by each of the two or more users of the two or more clients; and a user associating unit configured to associate the divided order data with sharing users sharing the divided order data.

Also, the present invention provides a server that is used in a layout creation system for jointly creating order data that determines a layout of a photo book by two or more users of two or more clients connected to the server via a network, the server comprising:

an order data retainer configured to retain two or more pieces of separate order data separately created by the two or more users of the two or more clients;

an order data combiner configured to combine the two or more pieces of separate order data to create combined order data in accordance with an instruction to combine the two or more pieces of separate order data as input by each of the two or more users; and a user associating unit configured to associate the combined order data with two or more sharing users being users who share the combined order data and each have created each of the two or more pieces of separate order data.

Also, the present invention provides a client that is used in a layout creation system for jointly creating order data that determines a layout of a photo book by two or more users of two or more clients connected to a server via a network, the client comprising:

a priority determiner configured to determine priorities of user images based on information on shared images shared among the two or more users of the two or more clients, each of the shared images being transmitted from each of the two or more clients to the server and used in the layout of the photo book, information on the user images owned by the two or more users and retained in the two or more clients, and terminal information of the two or more clients; and a display unit configured to list and display the user images with a user image having higher priority being prioritized over a user image having lower priority.

Also, the present invention provides a layout creation method for jointly creating order data that determines a layout of a photo book by two or more users of two or more clients connected to a server via a network, the method comprising the steps of:

retaining one piece of joint order data jointly created by the two or more users, with an order data retainer of the server;

receiving an instruction to divide the joint order data as input by a relevant one of the two or more users, with an instruction input unit of each of the two or more clients;

creating divided order data having a same layout as the joint order data in accordance with the instruction to divide the joint order data, with an order data divider of the server; and associating the divided order data with sharing users sharing the divided order data, with a user associating unit of the server.

Also, the present invention provides a layout creation method for jointly creating order data that determines a layout of a photo book by two or more users of two or more clients connected to a server via a network, the method comprising the steps of:

receiving an instruction to combine two or more pieces of separate order data created separately by the two or more users as input by a relevant one of the two or more users, with an instruction input unit of each of the two or more clients;

combining the two or more pieces of separate order data to create combined order data in accordance with the instruction to combine two or more pieces of separate order data, with an order data combiner of the server; and associating the combined order data with two or more sharing users being users who share the combined order data and each have created each of the two or more pieces of separate order data, with a user associating unit of the server.

Also, the present invention provides a non-transitory computer-readable recording medium storing a program for causing a computer to execute each of the steps of the layout creation method described above.

In the invention, joint order data can be divided to create divided order data, and the divided order data and sharing users who share this divided order data can be associated with each other. Thus, according to the invention, each user or specific user group is able to receive joint order data that has been created or is still in the process of being created, to perform subsequent creation processing.

Furthermore, in the invention, two or more pieces of separate order data can be combined to create combined order data, and the combined order data and sharing users who share this combined order data can be associated with each other. Thus, according to the invention, when each user creates order data separately, two or more pieces of separate order data of a specific user group can be combined to create combined order data.

Furthermore, in the invention, the priorities of user images can be determined, and a list display of user images can be altered in accordance with the priorities of the user images. Thus, according to the invention, the troublesomeness can be eliminated when a user designates a user image to be transmitted to a server as a shared image from among user images, and a desired user image can be easily selected from among a plurality of user images.

DETAILED DESCRIPTION OF THE INVENTION

Hereinafter, a layout creation system, a server, a client, a layout creation method, a program, and a recording medium of the invention will be described in detail on the basis of a preferred embodiment illustrated in the accompanying drawings.

Figure 1:
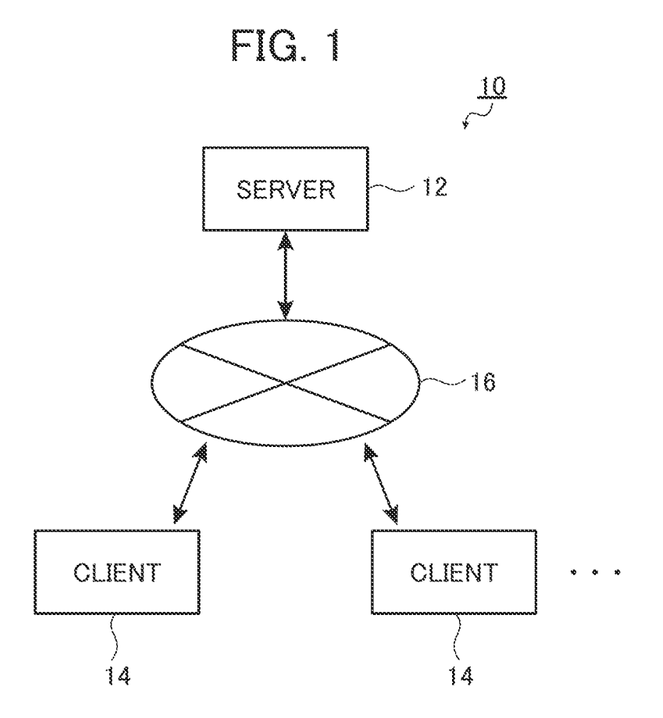
FIG. 1 is a block diagram of an embodiment illustrating the configuration of a layout creation system of the invention.

FIG. 1 is a block diagram of an embodiment illustrating the configuration of the layout creation system of the invention. A layout creation system 10 illustrated in FIG. 1 comprises a server 12 and two or more clients 14 connected to the server 12 via a network 16 such as the Internet. The layout creation system 10 is configured to be used by users of the two or more clients 14 to jointly create order data that determines the layout of a photo book.

Figure 2:
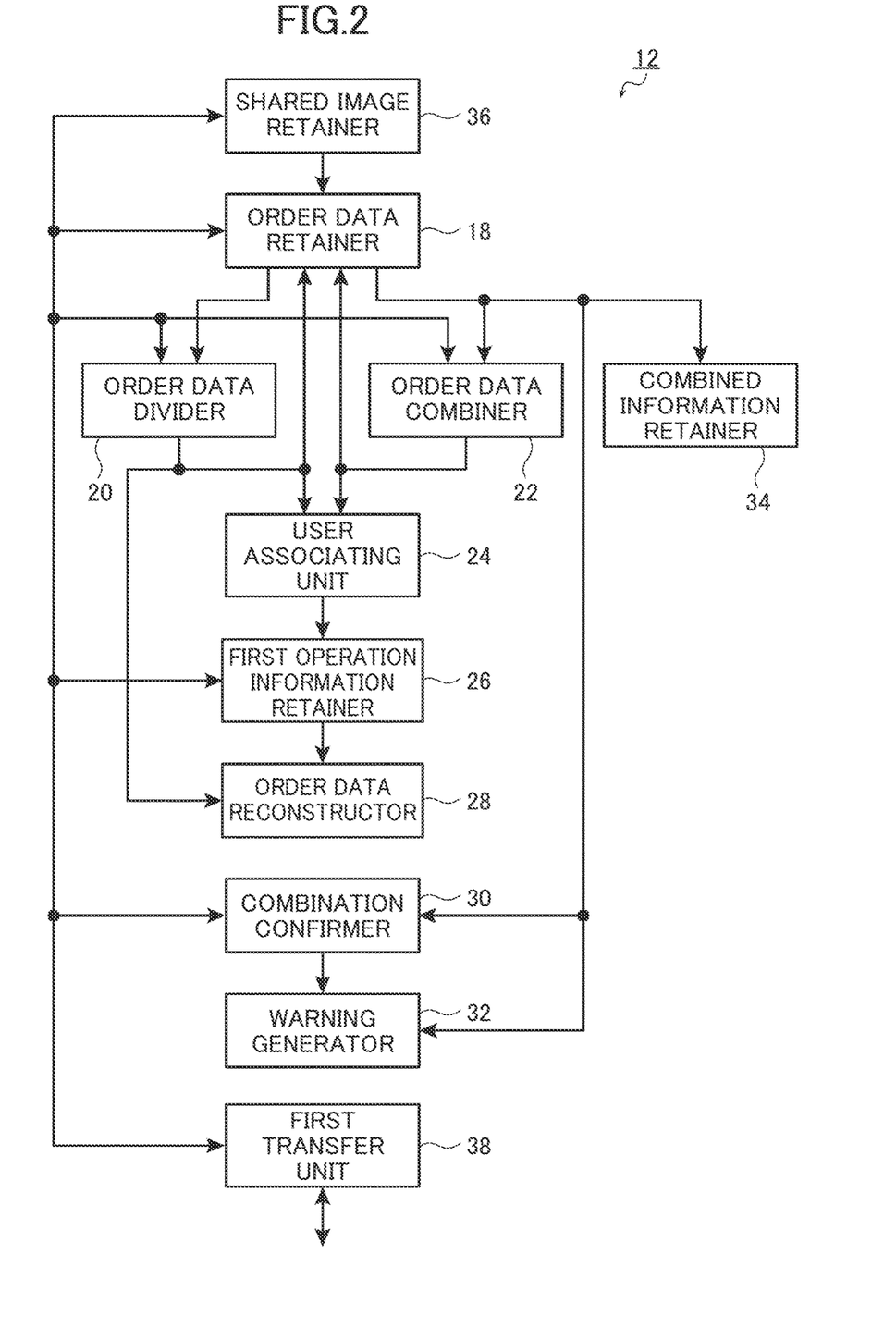
FIG. 2 is a block diagram of an embodiment illustrating the configuration of a server illustrated in FIG. 1.

FIG. 2 is a block diagram of an embodiment illustrating the configuration of the server illustrated in FIG. 1. As illustrated in FIG. 2, the server 12 comprises an order data retainer 18, an order data divider 20, an order data combiner 22, a user associating unit 24, a first operation information retainer 26, an order data reconstructor 28, a combination confirmer 30, a warning generator 32, a combined information retainer 34, a shared image retainer 36, and a first transfer unit 38.

The order data retainer 18 is configured to retain various types of order data.

The order data retainer 18 retains, for example, one piece of joint order data jointly created by two or more users, pieces of divided order data created by dividing joint order data, pieces of separate order data separately created by two or more users, combined order data created by combining two or more pieces of separate order data, and the like.

Figure 3:
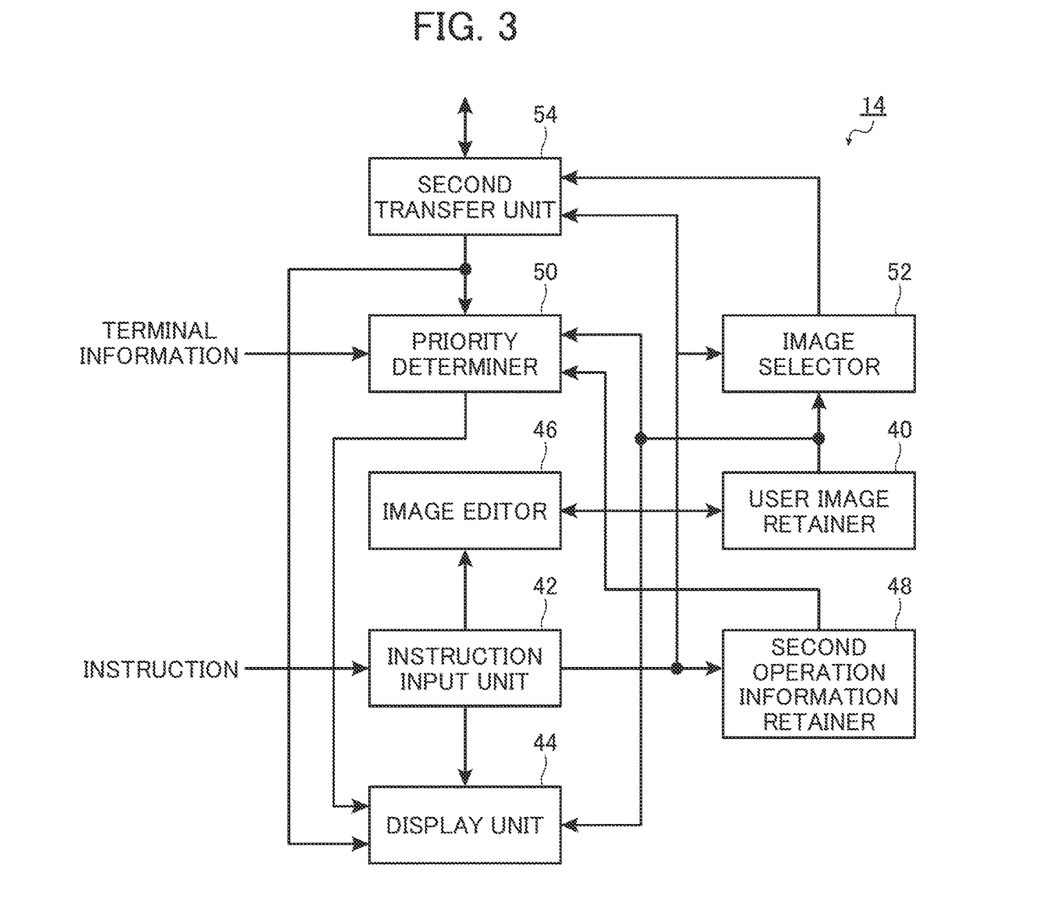
FIG. 3 is a block diagram of an embodiment illustrating the configuration of each of clients illustrated in FIG. 1.

The order data divider 20 is configured to create divided order data having the same layout as joint order data, in accordance with an instruction to divide the joint order data as received by an instruction input unit 42 of each of the clients 14 used by each of the users.

The order data divider 20 divides the joint order data to create divided order data, by copying the joint order data while the joint order data is being retained so that the existing joint order data is not affected.

It should be noted that the joint order data may be the one having been created or the one still in the process of being created.

The order data combiner 22 is configured to combine two or more pieces of separate order data to create combined order data, in accordance with an instruction to combine pieces of separate order data as received by the instruction input unit 42 of each of the clients 14.

Similarly, the order data combiner 22 uses images that are used in photo books determined by two or more respective pieces of separate order data to create combined order data that determines the layout of a photo book, while the existing separate order data is retained.

For example, when images A and B are separately used in photo books determined by pieces of separate order data A and B, the order data combiner 22 uses the images A and B to create combined order data that determines the layout of a photo book.

It should be noted that the separate order data may be the one having been created or the one still in the process of being created.

The user associating unit 24 is configured to associate divided order data with sharing users who share the divided order data, and to associate combined order data with two or more sharing users who share the combined order data.

The first operation information retainer 26 is configured to retain first operation information that indicates information on operations performed by each of the sharing users as received by the instruction input unit 42 of each of the clients 14.

Here, the first operation information includes, for example, information on a shared image shared among two or more users, the shared image being transmitted from each of the clients 14 to the server 12 and used in the layout of a photo book; information on a selected image that is a shared image to be used in the layout of the photo book as selected by each of the sharing users from among shared images; and editing information having information on editing (trimming, image correction, red eye correction, or the like) of joint order data conducted by each of the sharing users (image editor 46).

The order data reconstructor 28 is configured to reconstruct the layout of a photo book determined by the divided order data, on the basis of the first operation information of sharing users associated with the divided order data.

The combination confirmer 30 is configured to confirm whether or not each of the two or more pieces of separate order data is combined order data that has already been combined with another piece of separate order data, before the order data combiner 22 combines the two or more pieces of separate order data.

The warning generator 32 is configured to issue various types of warnings.

The warning generator 32, for example, issues a warning when it is confirmed that at least one of two or more pieces of separate order data is combined order data, when the two or more pieces of separate order data are different, and in other cases, before the two or more pieces of separate order data are combined.

The warning may be issued by displaying a message or the like, or audibly issued, or these may be used in combination.

The combined information retainer 34 is configured to, when the order data combiner 22 has combined two or more pieces of separate order data to create combined order data, associate and retain each of the two or more pieces of separate order data that have been combined in order to create that combined order data, and each of two or more sharing users who created each of the two or more pieces of separate order data.

The shared image retainer 36 is configured to retain shared images shared among the users of the two or more clients 14, each of the shared images are transmitted (uploaded) from each of the clients 14 to the server 12 and used in the layout of the photo book.

The first transfer unit 38 is configured to transfer (transmit and receive) data such as various types of instructions and images between the server 12 and the clients 14.

FIG. 3 is a block diagram of an embodiment illustrating the configuration of each of the clients 14 illustrated in FIG. 1. Each of the clients 14 is used by each of the users and, as illustrated in FIG. 3, comprises a user image retainer 40, an instruction input unit 42, a display unit 44, the image editor 46, a second operation information retainer 48, a priority determiner 50, an image selector 52, and a second transfer unit 54.

The user image retainer 40 is configured to retain user images.

The instruction input unit 42 is configured to receive various types of instructions input by the user.

The instruction input unit 42 receives, for example, an instruction to divide joint order data, an instruction to combine two or more pieces of separate order data, and the like.

The display unit 44 is configured to display various types of displays and images and the like.

The image editor 46 is configured to edit images such as a shared image and a user image in accordance with an instruction to edit an image as received by the instruction input unit 42.

The second operation information retainer 48 is configured to retain second operation information that indicates information on an operation performed by a user on a shared image and a user image owned by that user.

Here, the second operation information includes, for example, editing information having information on editing (trimming, image correction, red eye correction, or the like) of a shared image or a user image conducted by the user (the image editor 46), and information on operations conducted by the user such as browsing a shared image or a user image and enlarging the same for display.

The priority determiner 50 is configured to determine the priorities of user images on the basis of information on shared images, information on user images owned by the users and retained in the clients 14, and terminal information of the clients 14.

Here, the information on shared images and the information on user images include, for example, the photographing date and time, the image size, the owner of the image, image analysis information, and information on the photographing location (GPS: global positioning system), and the like. Furthermore, the information on shared images also includes information on a sender who sent the image to the server 12 and the like, in addition to the photographing date and time, the image size, the owner of the image, the image analysis information, and information on the photographing location.

Furthermore, the terminal information of the clients 14 includes, for example, the network speed, the network communication system (mobile data communication, Wi-Fi (wireless fidelity), or the like), and the like.

The image selector 52 is configured to select an image to be transmitted to the server 12 as a shared image from among the user images in accordance with an instruction to designate a user image as received by the instruction input unit 42.

The second transfer unit 54 is configured to transfer (transmit and receive) data such as various types of instructions and images, between the server 12 and the clients 14.

Next, the operation of the layout creation system 10 will be described.

Figure 4:
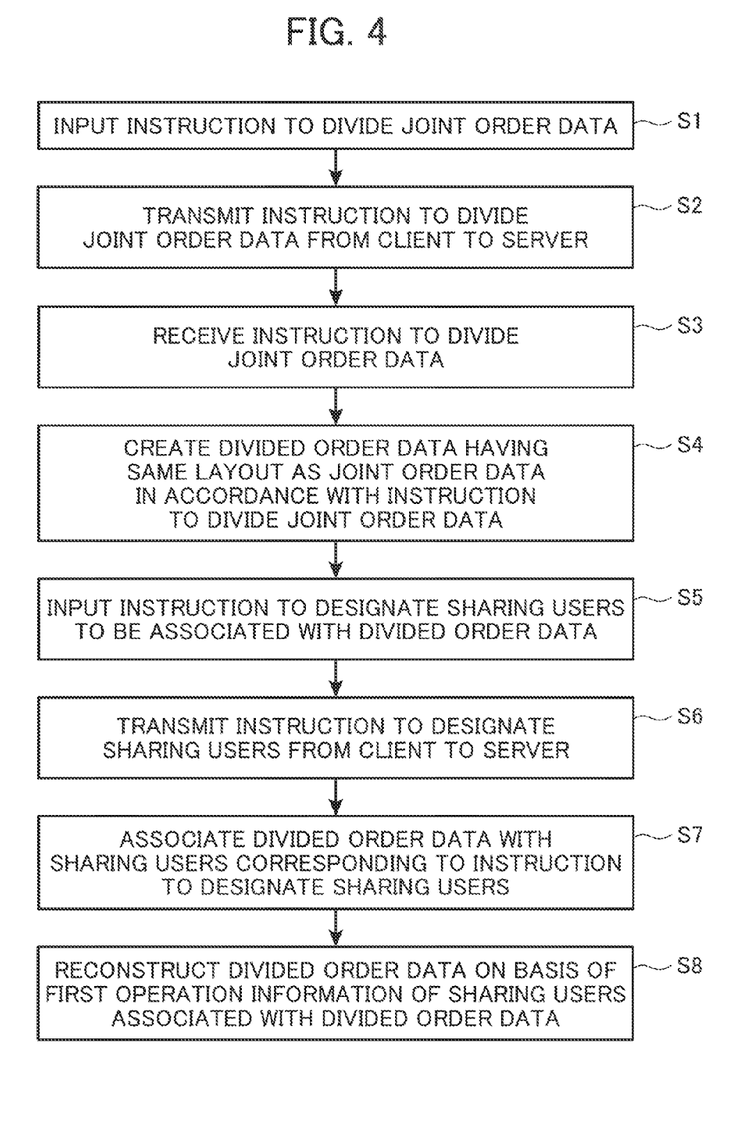
FIG. 4 is a flowchart of an embodiment illustrating the operation of the layout creation system when joint order data is divided to create divided order data.

First, the operation of the layout creation system 10 when joint order data is divided to create divided order data will be described with reference to the flowchart of FIG. 4.

Here, it is assumed that one piece of joint order data jointly created by two or more users is retained in the order data retainer 18 of the server 12.

When divided order data is created, first, in a client 14, a user inputs an instruction to divide joint order data, to the instruction input unit 42 (Step S1).

In response, the instruction input unit 42 receives the instruction to divide the joint order data as input by the user, and the second transfer unit 54 transmits, from the client 14 to the server 12, the instruction to divide the joint order data as received by the instruction input unit 42 (Step S2).

Then, in the server 12, the first transfer unit 38 receives the instruction to divide the joint order data as transmitted from the client 14 (Step S3).

Then, the order data divider 20 creates divided order data having the same layout as the joint order data, in accordance with the instruction to divide the joint order data as received by the first transfer unit 38 (Step S4).

Figure 5:
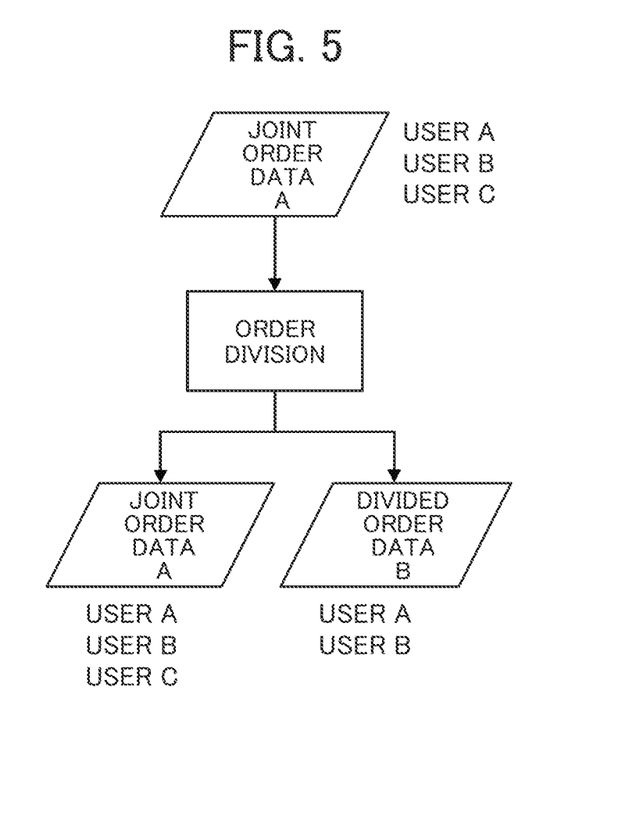
FIG. 5 is a conceptual diagram of an embodiment illustrating the operation of the layout creation system when joint order data is divided to create divided order data.

As illustrated in FIG. 5, when joint order data A is to be divided, the order data divider 20 divides the joint order data A (performs order division) to create divided order data B, by copying the joint order data A while the joint order data A is being retained.

Then, in the client 14, the user inputs an instruction to designate sharing users to be associated with the divided order data (Step S5).

Figure 6:
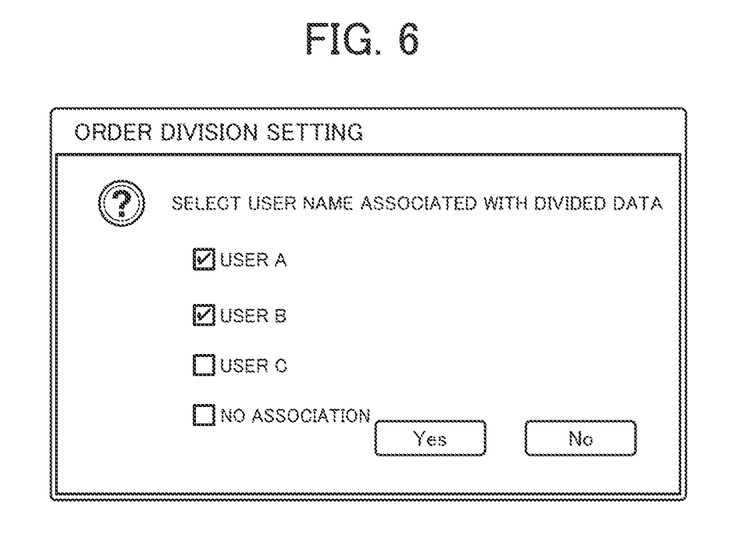
FIG. 6 is a conceptual diagram of an embodiment illustrating a designation screen for designating sharing users.

In this case, as illustrated in FIG. 6, a designation screen (GUI: graphical user interface) used by the user to designate sharing users may be displayed on the display unit 44.

In the designation screen illustrated in FIG. 6, users A, B, and C who are associated with the joint order data A illustrated in FIG. 5 are displayed as sharing user names, and an item for designating no association is displayed.

In the example illustrated in FIG. 6, the user refers to the designation screen to input, to the instruction input unit 42, an instruction to designate, for example, users A and B as sharing users to be associated with the divided order data B, from among the users A, B, and C.

In response, similarly, the instruction input unit 42 receives the instruction to designate sharing users as input by the user with reference to the designation screen, and the second transfer unit 54 transmits this instruction to designate sharing users from the client 14 to the server 12 (Step S6).

Then, in the server 12, the user associating unit 24 associates the divided order data with sharing users corresponding to the instruction to designate sharing users (Step S7).

In the present embodiment, the user associating unit 24 associates the divided order data B with the users A and B in accordance with the instruction to designate sharing users.

It should be noted that, after the divided order data B has been created, the joint order data A is retained in association with the users A, B, and C.

As described above, settings for associating divided order data with sharing users can basically be designated manually by the user who input the instruction to divide the joint order data.

In this case, the user associating unit 24 may automatically set the user who input the instruction to divide the joint order data to be associated with the divided order data as one of the sharing users.

In this manner, in the layout creation system 10, joint order data can be divided to create divided order data, and the divided order data and sharing users who share this divided order data can be associated with each other. Thus, each user or specific user group is able to receive joint order data that has been created or is still in the process of being created, to perform subsequent creation processing.

Then, the order data reconstructor 28 reconstructs the layout of a photo book determined by the divided order data, on the basis of the first operation information of the sharing users who have been set to be associated with the divided order data (Step S8).

The order data reconstructor 28 can reconstruct the layout of a photo book by, from among shared images, preferentially adopting, for example, shared images that have been shared by sharing users, shared images that have been selected to be used in the photo book by sharing users, shared images that have been edited by sharing users, and the like, as images to be used in the photo book, and by arranging such images in a large display frame region.

Specifically, the order data reconstructor 28, for example, reconstructs the layout of photo book with shared images that have been shared (uploaded) by a user (user C in the example of FIG. 5) who is not associated with the divided order data being excluded, or reconstructs the layout of a photo book such that shared images that have been selected to be used in the photo book by sharing users (users A and B in the example of FIG. 5) associated with the divided order data are arranged in a large display frame region (displayed with a large size).

Next, the operation of the layout creation system 10 when pieces of separate order data are combined to create combined order data will be described with reference to the flowchart of FIG. 7.

Here, it is assumed that pieces of separate order data created separately by two or more users are retained in the order data retainer 18 of the server 12.

When combined order data is to be created, first, in a client 14, a user inputs an instruction to combine two or more pieces of separate order data, to the instruction input unit 42 (Step S9).

In response, similarly, the instruction input unit 42 receives this instruction to combine separate order data, and the second transfer unit 54 transmits this instruction to combine separate order data, from the client 14 to the server 12 (Step S10).

Figure 7:
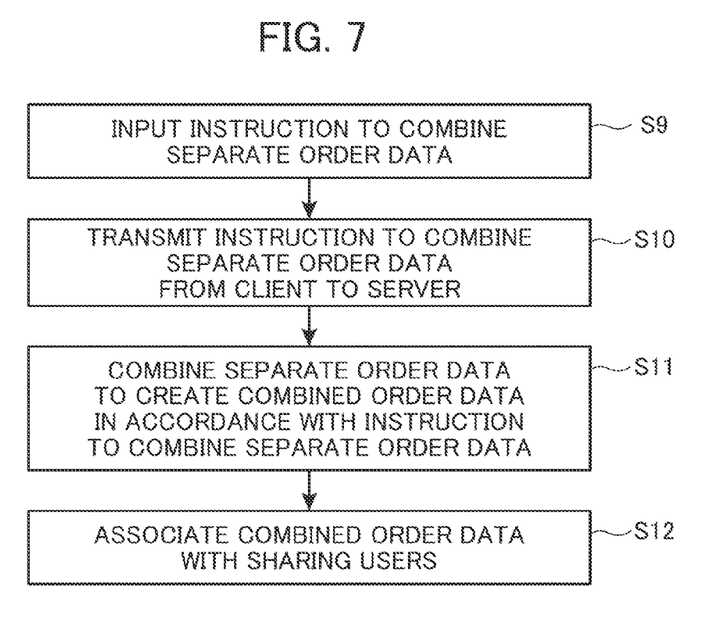
FIG. 7 is a flowchart of an embodiment illustrating the operation of the layout creation system when pieces of separate order data are combined to create combined order data.

Then, in the server 12, the order data combiner 22 combines the two or more pieces of separate order data (performs order combining) to create combined order data in accordance with the instruction to combine separate order data (Step S11), as illustrated in FIG. 7.

When two pieces of separate order data A and B are combined, the order data combiner 22 creates combined order data C that includes all of the images used by the two pieces of separate order data A and B, while the pieces of separate order data A and B are retained.

Then, the user associating unit 24 associates the combined order data with two or more sharing users who respectively created the two or more pieces of separate order data and share the combined order data (Step S12).

Figure 8:
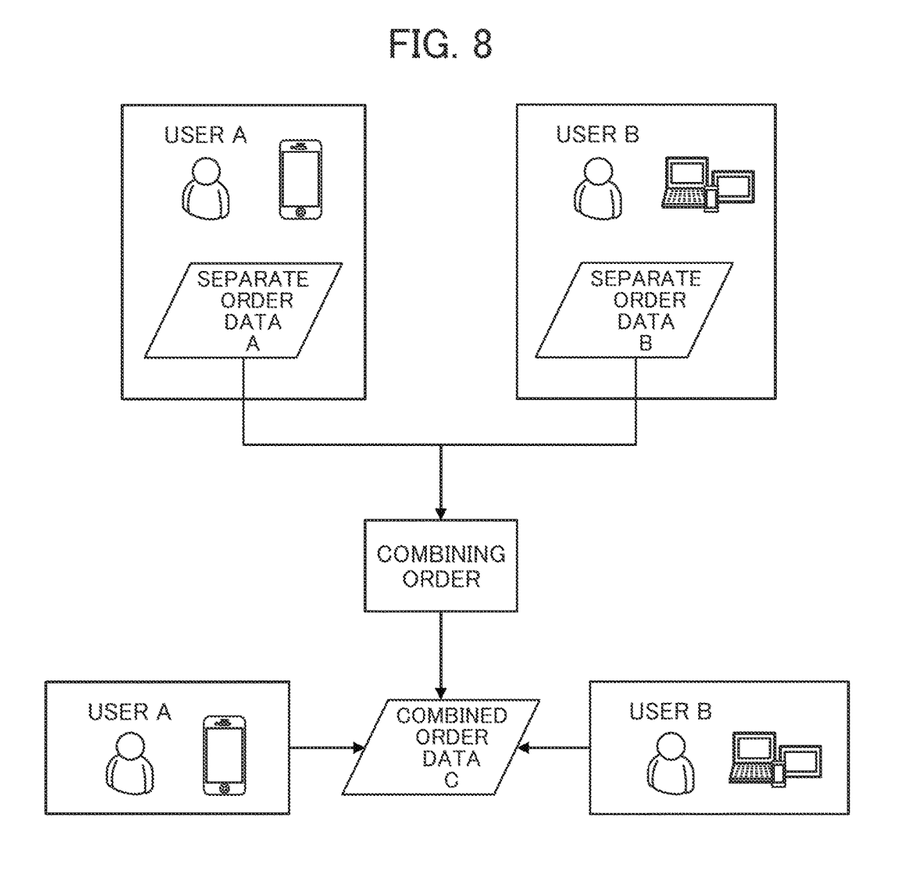
FIG. 8 is a conceptual diagram of an embodiment illustrating the operation of the layout creation system when pieces of separate order data are combined to create combined order data.

As illustrated in FIG. 8, when the separate order data A of a user A of two clients 14 and the separate order data B of a user B of the two clients 14 are combined to create the combined order data C, the user associating unit 24 associates the combined order data C with the users A and B.

In this manner, in the layout creation system 10, two or more pieces of separate order data can be combined to create combined order data, and the combined order data and sharing users who share this combined order data can be associated with each other. Thus, when each user creates order data separately, two or more pieces of separate order data of a specific user group can be combined to create combined order data.

It should be noted that, before the order data combiner 22 combines the two or more pieces of separate order data, the combination confirmer 30 may confirm whether or not each of the two or more pieces of separate order data is combined order data that has already been combined with another piece of separate order data.

For example, when the two pieces of separate order data A and B have been combined to create the combined order data C, and thereafter this combined order data C and the separate order data A (or the separate order data B) are to be combined, the combination confirmer 30 determines that the separate order data A is combined order data that has already been combined.

Here, when it is confirmed that at least one of the two or more pieces of separate order data is combined order data, for example, the warning generator 32 may issue a warning and the order data combiner 22 may be configured not to combine the two or more pieces of separate data.

Furthermore, when it is confirmed that at least one of the two or more pieces of separate order data is combined order data, and with respect to separate order data combined in the confirmed combined order data, separate order data resulting from editing of the separate order data combined is to be combined, the order data combiner 22 may combine the difference between the separate order data combined and the separate order data edited.

An example is the case where the two pieces of separate order data A and B are combined to create the combined order data C, and thereafter this combined order data C is combined with separate order data A' (or separate order data B') resulting from editing of the separate order data A. In this case, the order data combiner 22 combines the difference between the separate order data A' and the separate order data A with the combined order data C.

Furthermore, when the order data combiner 22 has combined two or more pieces of separate order data (the two pieces of separate order data A and B in the example of FIG. 8) to create combined order data (the combined order data C in the example of FIG. 8), the combined information retainer 34 may retain each of the two or more pieces of separate order data in association with each of two or more sharing users who created each of the two or more pieces of separate order data.

The layout creation system 10 can thereby, at any time, divide the combined order data into the two or more pieces of separate order data that were combined in order to create this combined order data.

Furthermore, in the layout creation system 10, when each user creates separate order data, a shared image retained in the shared image retainer 36 or an image resulting from editing of a shared image by each user can be used. Therefore, a plurality of similar images made up of either one of or both of identical images and images resulting from different editing of identical images may be included in images used in the two or more pieces of separate order data.

In this case, the order data combiner 22 may use all of the plurality of similar images to combine the two or more pieces of separate order data, for example.

However, using a plurality of similar images in a photo book is not desirable as product marketability is impaired.

Therefore, when a plurality of similar images are included in images used in two or more pieces of separate order data, the order data combiner 22 may use only one similar image from among the plurality of similar images to combine the two or more pieces of separate order data.

When the order data combiner 22 uses only one similar image from among the plurality of similar images to combine the two or more pieces of separate order data, the one similar image to be used may be designated by the user.

In this case, for example, the plurality of similar images are listed and displayed on the display unit 44, and the user inputs an instruction to designate one similar image from among the plurality of similar images listed and displayed on the display unit 44, to the instruction input unit 42.

In response, the order data combiner 22 uses only the one similar image that corresponds to the instruction to designate one similar image as received by the instruction input unit 42.

Furthermore, in this case, when any one similar image from among the plurality of similar images is displayed on the display unit 44 and the user moves a mouse over the one similar image (causes the mouse pointer to move over the one similar image) displayed on the display unit 44, all of the remaining similar images among the plurality of similar images may be displayed on the display unit 44 in accordance with a mouseover instruction received by the instruction input unit 42.

The user is thereby able to easily designate any one similar image from among the plurality of similar images.

Furthermore, when only one similar image from among the plurality of similar images is used to combine two or more pieces of separate order data, the order data combiner 22 may select one similar image from among the plurality of similar images and use the selected one similar image.

In this case, the order data combiner 22 can select, for example, one similar image in which the size of a person is the largest, or one similar image having the closest aspect ratio to a frame of a photo book, from among the plurality of similar images.

Furthermore, when only one similar image from among the plurality of similar images is used to combine two or more pieces of separate order data, the order data combiner 22 may select two or more similar images from among the plurality of similar images and use one similar image created by combining the selected two or more similar images.

For example, when a color correction has been performed on a first similar image of the selected two similar images and trimming has been performed on a second similar image, a similar image created by combining the color correction of the first similar image and the trimming of the second similar image is used.

Furthermore, the warning generator 32 may issue a warning when the two or more pieces of separate order data are different.

The warning generator 32 may issue a warning when, for example, the photographing periods of images used in the two or more pieces of separate order data are different. The photographing period is important when a photo book is created with a theme of travel, for example.

Furthermore, the warning generator 32 may issue a warning when images used in the two or more pieces of separate order data have different photographing location information. Similarly, issuing a warning for an image having a completely different photographing place is important when a photo book is created with a theme of travel.

Furthermore, the warning generator 32 may issue a warning when the themes being used in two or more pieces of separate order data are different. The reason therefor is because, when the theme of a photo book has already been determined in each piece of separate order data, it is difficult to determine which of the themes being used in the two or more pieces of separate order data is to be adopted as the theme to be used in the combined order data.

Furthermore, after the warning generator 32 has issued a warning, the names of the themes being used in the two or more pieces of separate order data may be displayed on the display unit 44, and the user may refer to the names of the themes displayed on the display unit 44 to input an instruction to designate the name of one theme from thereamong, to the instruction input unit 42.

In this case, the order data combiner 22 adopts one theme that corresponds to the instruction to designate the name of one theme, as the theme to be used in the combined order data.

Furthermore, the order data combiner 22 may automatically determine the theme (travel, wedding ceremony, or the like) to be used in the combined order data by, for example, performing image analysis to perform reevaluation on the basis of the images being used in the two or more pieces of separate order data.

Furthermore, when combined order data is created, the order data combiner 22 may automatically select images to be used in a photo book.

For example, the order data combiner 22 can use images being used in a photo book determined by each of the two or more pieces of separate order data prior to combining, for a photo book determined by the combined order data after combining, without modifying the images. Furthermore, images being used in a photo book determined by each of the two or more pieces of separate order data prior to combining may be reevaluated, and images having a high evaluation (an evaluation that is equal to or greater than a threshold value) may be used in a photo book determined by the combined order data; and images matching up with a theme used in the combined order data may be used in a photo book determined by the combined order data.

Figure 9:
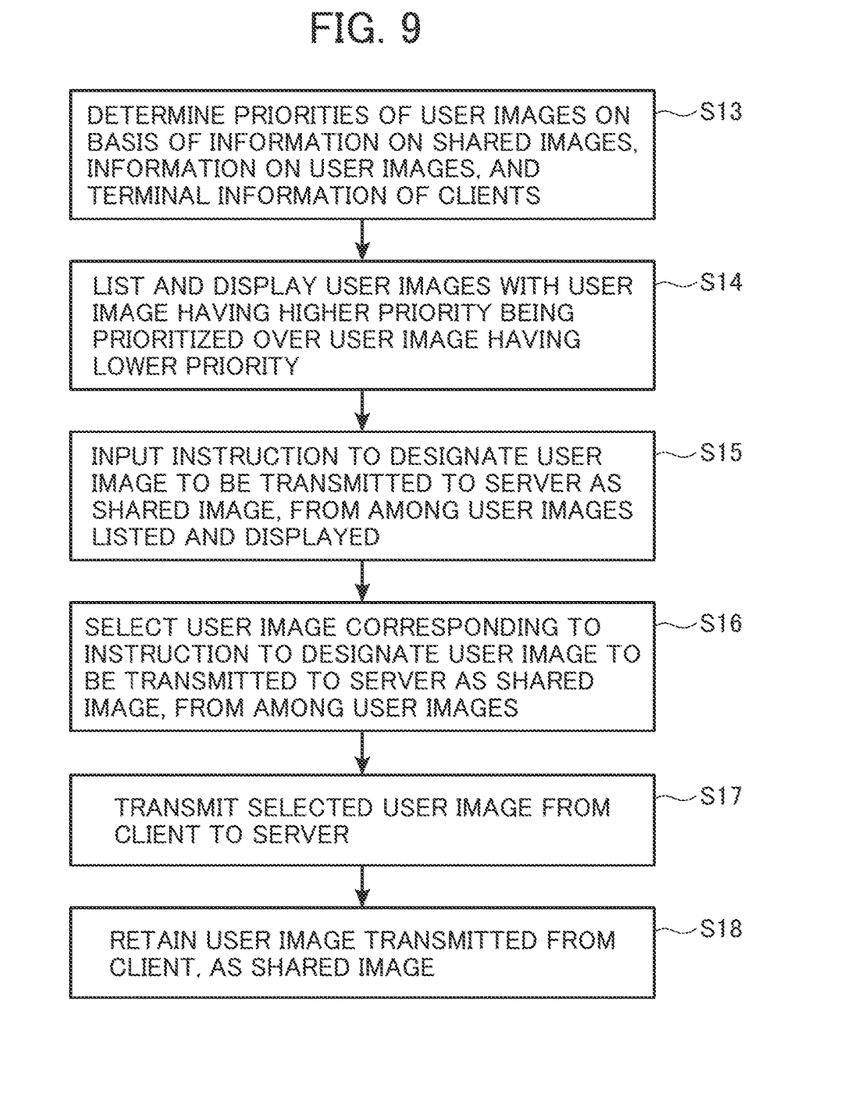
FIG. 9 is a flowchart of an embodiment illustrating the operation of the layout creation system when a user designates a user image to be transmitted to a server as a shared image from among user images.

Next, the operation of the layout creation system 10 when a user designates a user image to be transmitted to the server 12 as a shared image from among user images will be described with reference to the flowchart of FIG. 9.

Figure 10:
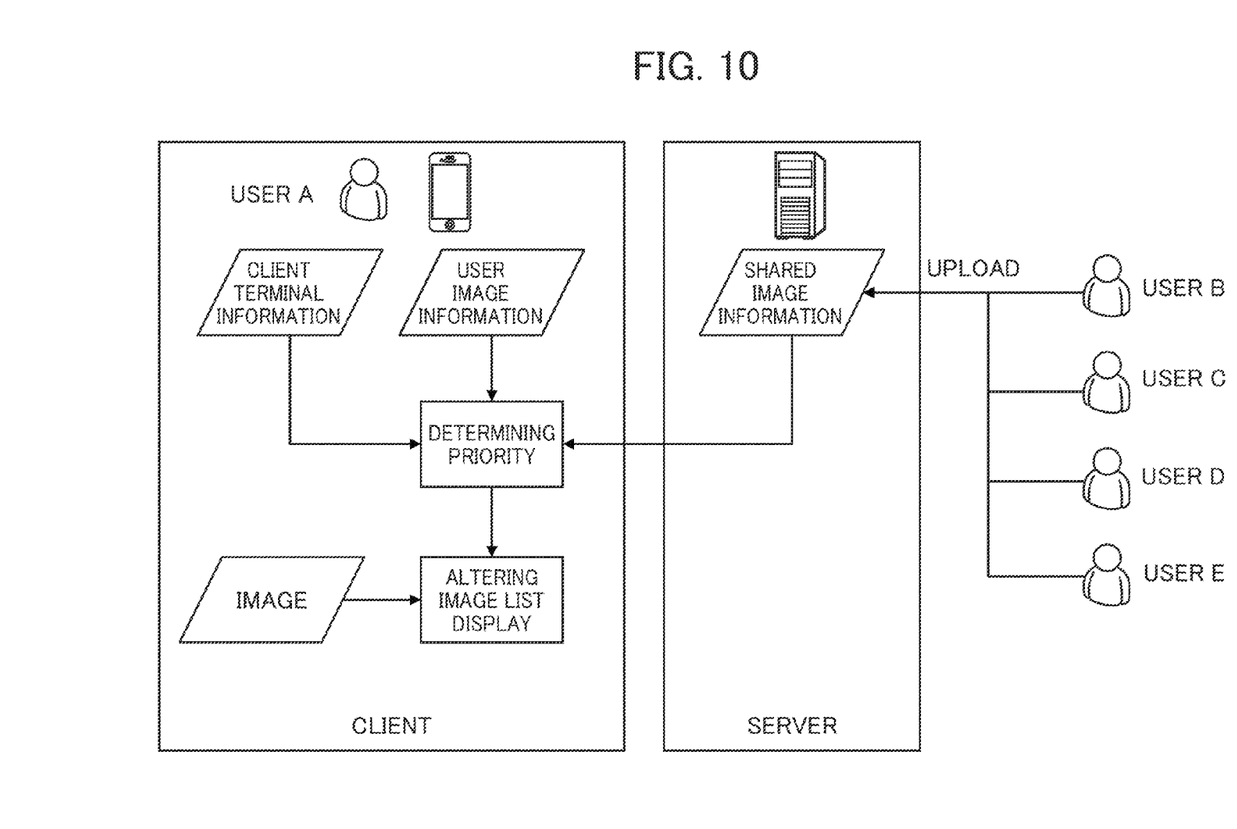
FIG. 10 is a conceptual diagram of an embodiment illustrating the operation of the layout creation system when a user designates a user image to be transmitted to a server as a shared image from among user images.

Here, as illustrated in FIG. 10, it is assumed that shared images that have been transmitted (uploaded) to the server 12 from each of users B, C, D, and E are retained in the shared image retainer 36 of the server 12.

As illustrated in FIG. 10, when user A designates a user image to be transmitted to the server 12 as a shared image from among user images, first, in the client 14 of user A, the priority determiner 50 determines the priorities of user images on the basis of information on shared images, information on user images, and terminal information of the client 14 (Step S13).

The priority determiner 50, for example, can give higher priority to user images having the same photographing date and time as the photographing date and time of the shared images, user images having a photographing location that is close to the photographing location of the shared images (having a photographing location being closer than a position defined by a threshold value), or the like over other images.

On the other hand, from the terminal information of the client 14 of user A, when the network speed is slow (the network speed is lower than a threshold value) or the network communication system is mobile data communication, user images having a large image size, user images that are similar to the shared images (user images having a degree of similarity that is higher than a threshold value), or the like can be given lower priority over other images.

Then, the user images are listed and displayed on the display unit 44 with a user image having higher priority being prioritized over a user image having lower priority (Step S14). In short, the list display of the user images is altered according to the priority.

For example, the user images can be rearranged in descending order of priority and listed and displayed on the display unit 44, and the user images can be listed and displayed on the display unit 44 with user images having the priority that is higher than a preset threshold value being marked.

In this manner, in the layout creation system 10, the priorities of user images can be determined, and a list display of user images can be altered in accordance with the priorities of the user images. The troublesomeness can be thereby eliminated when a user designates a user image to be transmitted to the server 12 as a shared image from among user images, and a desired user image can be easily selected from among a plurality of user images.

Then, the user inputs, to the instruction input unit 42, an instruction to designate a user image to be transmitted to the server 12 as a shared image, from among the user images listed and displayed on the display unit 44 (Step S15).

In response, the instruction input unit 42 receives this instruction to designate a user image to be transmitted to the server 12 as a shared image.

Then, the image selector 52 selects a user image that corresponds to the instruction to designate a user image to be transmitted to the server 12 as a shared image, from among the user images (Step S16).

Then, the second transfer unit 54 transmits (uploads) the selected user image from the client 14 to the server 12 (Step S17).

In response, in the server 12, the first transfer unit 38 receives the user image transmitted from the client 14. The received user image is retained in the shared image retainer 36 as a shared image (Step S18).

It should be noted that the priority determiner 50 may determine the priority of a user image on the basis of the second operation information retained in the second operation information retainer 48, in addition to the information on the shared images, the information on the user images, and the terminal information of the client 14.

The priority determiner 50, for example, can determine that a user image that has been edited by the user has a high priority for that user. Furthermore, when the user has not designated a user image as a user image to be transmitted to the server 12 as a shared image despite having enlarged and displayed the user image for confirmation, it can be determined that the user image has a low priority for that user.

The device of the invention may be configured such that each of the components provided therein is constituted of dedicated hardware or a programmed computer.

The method of the invention can be implemented by a program for causing a computer to execute each of the steps of the method, for example. Furthermore, a computer-readable recording medium having this program recorded therein can also be provided.

The invention is basically as described above.

Heretofore, a detailed description has been given regarding the invention; however, it goes without saying that the invention is not restricted to the aforementioned embodiment and various improvements or modifications may be made without deviating from the gist of the invention.

What is claimed is:

1. A layout creation system for jointly creating order data that determines a layout of a photo book by two or more users of two or more clients connected to a server via a network,
   the server comprising:
   an order data retainer configured to retain one piece of joint order data jointly created by the two or more users,
   each of the two or more clients comprising:
   an instruction input unit configured to receive an instruction to copy the joint order data as input by a relevant one of the two or more users, and
   the server further comprising:
   an order data copying unit configured to create copied order data having a same layout as the joint order data in accordance with the instruction to copy the joint order data; and
   a user associating unit configured to associate the copied order data with sharing users sharing the copied order data,
   wherein the order data retainer, the instruction input unit, the order data copying unit, and the user associating unit are comprised of circuitry or a programmed computer,
   wherein each of the two or more clients further comprises a display unit configured to display a designation screen for designating the sharing users,
   wherein the instruction input unit receives an instruction to designate the sharing users as input by a relevant one of the two or more users with reference to the designation screen, and
   wherein the user associating unit associates the copied order data with sharing users corresponding to the instruction to designate the sharing users.

2. A layout creation system for jointly creating order data that determines a layout of a photo book by two or more users of two or more clients connected to a server via a network,
   the server comprising:
   an order data retainer configured to retain one piece of joint order data jointly created by the two or more users,
   each of the two or more clients comprising:
   an instruction input unit configured to receive an instruction to copy the joint order data as input by a relevant one of the two or more users, and
   the server further comprising:
   an order data copying unit configured to create copied order data having a same layout as the joint order data in accordance with the instruction to copy the joint order data; and
   a user associating unit configured to associate the copied order data with sharing users sharing the copied order data,
   wherein the order data retainer, the instruction input unit, the order data copying unit, and the user associating unit are comprised of circuitry or a programmed computer,
   wherein the user associating unit automatically sets a user having input the instruction to copy the joint order data to be associated with the copied order data as one of the sharing users.

3. The layout creation system according to claim 2, wherein the server further comprises a first operation information retainer configured to retain first operation information indicating information on an operation performed by each of the sharing users,
   wherein the first operation information retainer is comprised of circuitry or a programmed computer.

4. A layout creation system for jointly creating order data that determines a layout of a photo book by two or more users of two or more clients connected to a server via a network, the server comprising:
an order data retainer configured to retain one piece of joint order data jointly created by the two or more users,
each of the two or more clients comprising:
an instruction input unit configured to receive an instruction to copy the joint order data as input by a relevant one of the two or more users, and
the server further comprising:
an order data copying unit configured to create copied order data having a same layout as the joint order data in accordance with the instruction to copy the joint order data; and
a user associating unit configured to associate the copied order data with sharing users sharing the copied order data,
wherein the order data retainer, the instruction input unit, the order data copying unit, and the user associating unit are comprised of circuitry or a programmed computer,
wherein the server further comprises a shared image retainer configured to retain shared images shared among the two or more users of the two or more clients, each of the shared images being transmitted from each of the two or more clients to the server and used in the layout of the photo book, and
each of the two or more clients further comprises:
a priority determiner configured to determine priorities of user images based on information on the shared images, information on the user images owned by the two or more users and retained in the two or more clients, and terminal information of the two or more clients; and
a display unit configured to list and display the user images with a user image having higher priority being prioritized over a user image having lower priority,
wherein the first operation information retainer is comprised of circuitry or a programmed computer.

5. A layout creation method for jointly creating order data that determines a layout of a photo book by two or more users of two or more clients connected to a server via a network, the method comprising:
retaining one piece of joint order data jointly created by the two or more users, with an order data retainer of the server;
receiving an instruction to copy the joint order data as input by a relevant one of the two or more users, with an instruction input unit of each of the two or more clients;
creating copied order data having a same layout as the joint order data in accordance with the instruction to copy the joint order data, with an order data copying unit of the server;
associating the copied order data with sharing users sharing the copied order data, with a user associating unit of the server,
wherein the order data retainer, the instruction input unit, the order data copying unit, and the user associating unit are comprised of circuitry or a programmed computer;
determining priorities of user images based on information on shared images shared among the two or more users of the two or more clients, each of the shared images being transmitted from each of the two or more clients to the server and used in the layout of the photo book, information on the user images owned by the two or more users and retained in the two or more clients, and terminal information of the two or more clients, with a priority determiner of each of the two or more clients; and
listing and displaying the user images with a user image having higher priority being prioritized over a user image having lower priority, with a display unit of each of the two or more clients,
wherein the priority determiner is comprised of circuitry or a programmed computer.

6. A non-transitory computer-readable recording medium storing a program for causing a computer to execute each of the steps of the layout creation method described in claim 5.

* * * * *